(12) United States Patent
Jayne (10) Patent No.: US 7,331,829 B2
(45) Date of Patent: Feb. 19, 2008

(54) SNAP-IN MOUNTING BRACKET-TERMINAL BLOCK

(75) Inventor: Rob Jayne, Spokane, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 11/273,935

(22) Filed: Nov. 15, 2005

(65) Prior Publication Data

US 2007/0111610 A1 May 17, 2007

(51) Int. Cl.
*H01R 9/26* (2006.01)

(52) U.S. Cl. ...................... 439/713; 439/532

(58) Field of Classification Search ........... 439/713, 439/709, 534, 719, 49–54, 723, 532, 131; 361/825, 823, 627
See application file for complete search history.

(56) References Cited

U.S. PATENT DOCUMENTS

| | | | | |
|---|---|---|---|---|
| 3,784,728 A | * | 1/1974 | De Bortoli et al. | 174/60 |
| 3,904,936 A | * | 9/1975 | Hamrick et al. | 361/826 |
| 4,099,823 A | * | 7/1978 | D'Alessio | 439/491 |
| 5,299,945 A | * | 4/1994 | Norden | 439/157 |
| 5,606,489 A | * | 2/1997 | Heidorn et al. | 361/824 |
| 5,743,768 A | * | 4/1998 | Hohorst et al. | 439/723 |
| 5,836,791 A | * | 11/1998 | Waas et al. | 439/709 |

* cited by examiner

*Primary Examiner*—Tulsidas C. Patel
*Assistant Examiner*—Harshad C Patel
(74) *Attorney, Agent, or Firm*—Lee & Hayes, PLLC (57) ABSTRACT

Embodiments of a mounting bracket for a telecommunications terminal block are presented herein.

11 Claims, 8 Drawing Sheets

802
Form a Portion of a Mounting Bracket that is Pivotably Attachable to a Mounting Surface of a Terminal Block.

804
Arrange a Plurality of Side Arms on the Mounting Bracket to be Securable to a Corresponding Sidewall of the Terminal Block Adjacent to the Mounting Surface

Fig. 8

SNAP-IN MOUNTING BRACKET-TERMINAL BLOCK

FIELD OF THE INVENTION

The present disclosure relates to terminal blocks for mounting in a telecommunications equipment frame. More specifically, the disclosure relates to mounting brackets that secure terminal blocks in telecommunications equipment housings.

BACKGROUND

Terminal blocks are used in telecommunications infrastructure to provide interconnection points for telecommunications equipment. As such, terminal blocks may be used in a variety of sites within a telecommunications infrastructure and the design of a particular block may depend upon its application within the infrastructure.

Terminal blocks are typically mounted in a housing at a site within a telecommunications infrastructure, such as in a distribution frame at a central office site. Depending upon the application of a terminal block, different types or sizes of connectors may be provided. Industry standard 50 pin connectors or 64 pin connectors are commonly used. Terminal blocks traditionally have been mounted in telecommunications equipment housing by direct fastening between the housing and the chassis of the terminal block. This may make insertion and attachment of a pre-wired terminal block difficult. Further, it may be difficult to manage, rewire or perform maintenance on a terminal block and associated cabling with the terminal block directly fastened to a housing.

SUMMARY

A mounting bracket for a terminal block is described that permits "snap-in" insertion and removal of a terminal block from a telecommunications equipment housing. The terminal block may be used to interconnect a variety of equipment in telecommunications infrastructure. The mounting bracket may be mounted to a terminal block chassis along side contact areas which permit securement of a terminal block without obstructing cabling of the terminal block. The mounting bracket has side arms which engage with side contact areas along the sidewalls of a terminal block chassis to supporting and secure the terminal block. Further, the mounting bracket has an attachment portion which engages a corresponding attachment portion on a mounting surface of a terminal block chassis adjoining the sidewalls.

DETAILED DESCRIPTION

It should be noted that the following devices are examples and may be further modified, combined and separated without departing from the spirit and scope thereof.

Figure 1:
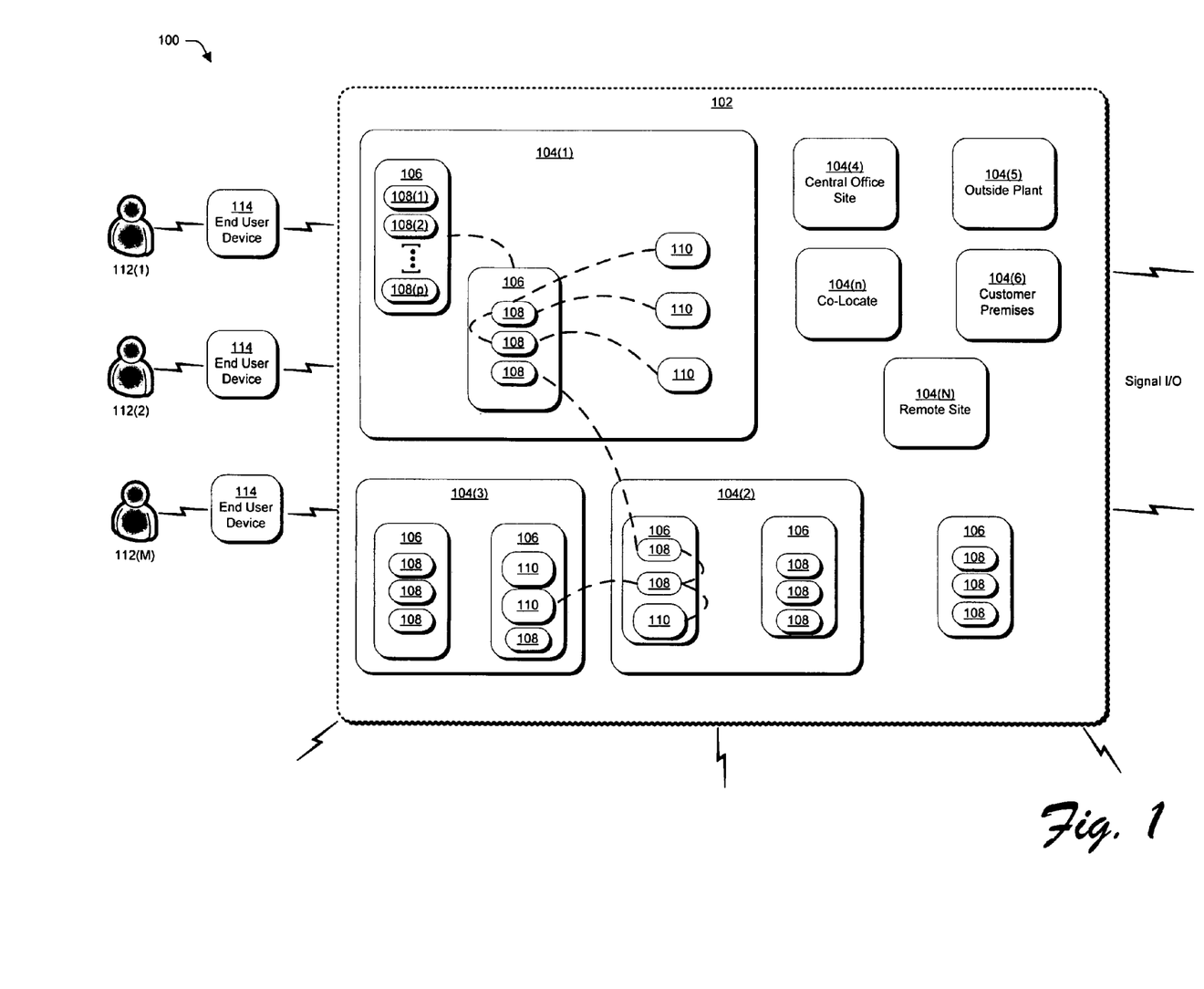
FIG. 1 is an illustration of an environment having a portion of a telecommunications infrastructure.

FIG. 1 illustrates an exemplary implementation of an environment 100 operable to provide a telecommunications network in which the apparatuses and procedures of the present disclosure may be employed. The environment 100 includes at least a portion of a telecommunication network infrastructure 102 (hereinafter "infrastructure"). Infrastructure 102 provides telecommunications processes, structures, equipment and devices between end-user devices such as modems, phones, and so on used by end-users outside of the infrastructure 102 to communicate via a telecommunications network. Within infrastructure 102 a variety of equipment, apparatus and devices are utilized in routing, processing, and distributing signals. Telecommunications signals and data may among other actions be processed, switched, routed, tested, patched, managed, or distributed by various equipment in the infrastructure 102.

A variety of sites 104(1)-104(N) within infrastructure 102 may maintain various equipment used in the infrastructure 102. As depicted in FIG. 1, infrastructure 102 may have numerous sites 104 which may be different physical locations within infrastructure 102 such as a central office, an outside plant site, a co-locate site, a remote site, or customer premises. Sites 104 may be locations within infrastructure 100 which may hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, for example the connection denoted in FIG. 1 by a dashed line between site 104(1) and 104(2). Naturally, numerous interconnections between a plurality of sites 104 typically may be made.

Each site 104 may have one or more housing 106 having a plurality of components 108. A housing refers to a structure to maintain or hold a plurality of components 108 in infrastructure 102 and may be configured in a variety of ways. For example, the housing 106 may be configured as a housing for a cabinet, a terminal block, a panel, a chassis, a digital cross-connect, a switch, a hub, a rack, a frame, a bay, a module, an enclosure, an aisle, or other structure for receiving and holding a plurality of components 108. Hereinafter, the terms housing and cabinet will be used for convenience to refer to the variety of structures in infrastructure 102 that may hold components 108. Housings 106 may be inside a building or housings may themselves be configured to be placed outside. Housings 106 may typically be configured to protect components 108 from environmental influences. The environment 100 of FIG. 1, for instance, depicts site 104(1) as having two housings (e.g. cabinets) 106, each having a plurality of components 108. Other housings 106 may be included throughout infrastructure 102 at sites 104, for example housings 106 depicted within site 104(2).

Components 108 are pieces of telecommunications equipment in infrastructure 102 that may be kept or maintained in a housing 106 (e.g. cabinet) within the infrastructure 102. Components for example may be cross-connect panels, modules, terminal blocks, chassis, backplanes, switches, digital radios, repeaters and so forth. Generally, components 108 may be those devices utilized for processing and distributing signals in infrastructure 102 and which may be maintained in a housing 104. Components 108 may also be used to manage cabling in infrastructure 102. Components 108 may terminate, interconnect or cross-connect a plurality of network elements 110 within infrastructure 102. Components 108 may be utilized to distribute telecommunications signals sent to and from infrastructure 102 by one or more end-users 112 using an end-user device 114. The interconnections between telecommunications equipment (e.g., cabinets 106, components 108 and network elements 110) provide signal pathways for telecommunications signals. Interconnection may be via one or more components 108 such as by connectors on a terminal block or may be internal to the components 108 such as via cabling within a component 108. Representative interconnections are shown by dashed lines in FIG. 1 and numerous interconnections within and between telecommunication equipment are typical.

Network elements 110 may be implemented in a variety of ways. For example, network elements 110 may be configured as switches, digital cross connect system (DCS), telecommunication panels, terminal blocks, digital radios, fiber optic equipment, network office terminating equipment, and any other telecommunication equipment or devices employed in a telecommunications infrastructure 102. It is noted that one or more of the components 108 within a cabinet 106 may also be a network element 110. In other words, network elements 110 may be found within a cabinet 106 as component 108 of the cabinet. Thus, in a particular cabinet 106 interconnections may be between network elements 110 externally (e.g., not in the same cabinet) or internally (e.g., within the same cabinet). Naturally, internal and external interconnections may be mixed such that a single cabinet 106 will have both internal and external interconnections. Further, such connections for a particular cabinet 106 might be made wholly within a particular site 104. Interconnections may also be made between a plurality of sites 104.

The environment 100 depicts a plurality of end users 112(1)-112(M) which may be communicatively coupled, one to another, via a telecommunication network including infrastructure 102. End users 112 may be implemented in a wide variety of ways, such as consumers, business users, internal users in a private network, and other types of users that use telecommunications signals or transmit and receive telecommunications signals. Additionally, for purposes of the following discussion clients 112(1)-112(M) may also refer to client devices and software which are operable to transmit and receive telecommunications signals. Thus, clients 112(1)-112(M) may be implemented as users, software and devices.

The interconnection of pieces of equipment (e.g. cabinets 106, components 108 and network elements 110, and so forth) provides signal pathways between equipment for signals input to and output from infrastructure 102. For example, end-users 112(1)-112(M) may send signals into the infrastructure 102 and receive signals output from the infrastructure using a variety of end user devices 114. For example, end user 112(2) may communicate with end user 112(M) via end-user device 114 (e.g., a telephone). Thus, signals sent to and from infrastructure by end-users 112 via an end user device 114, may be routed directed, processed, and distributed in a variety of ways via the equipment and interconnections within infrastructure 102.

In an implementation, one or more cabinets 106 may be configured as a distribution frame such as a main distribution frame (MDF) or intermediate distribution frame (IDF). A distribution frame has a plurality of components 108. Typically, components 108 in a distribution frame distribute telecommunications signals between network elements 110 within infrastructure 102 and between end-users 112. A distribution frame may provide a centralized interconnection point, for example in a telephone system which provides service to end-users 112, and having equipment for terminating and interconnecting end-user lines (e.g. subscribers). The distribution frame is used to connect end-users lines, one to another, or to connect end user lines through network elements 110 in infrastructure 102. The distribution frame in a site 104 may also hold protective devices and act as a test point between end-users 112 and equipment in infrastructure 102.

In an implementation, a cabinet 106 configured as a distribution frame has a plurality of components 108 to connect numerous lines. A cabinet 106 (e.g., a distribution frame) may have a plurality of components 108 configured as terminal blocks, as depicted in FIG. 1 by terminal blocks 108(1), 108(2), . . . , 108(p). Terminal blocks 108(1)-108(p) provide modular connection points within a cabinet 106 between end-user lines and between network elements 110 such as switches, cross-connects, other terminal blocks, and so forth. Naturally, terminal blocks 108(1)-108(p) are representative of numerous terminal blocks which may be found in numerous cabinets 106 within infrastructure 102.

End-users 112 may be connected via twisted pair cabling, or other cabling to terminal blocks 108(1)-108(p) in a cabinet 106 located within infrastructure 102. Further, end-users 112 may be connected via a plurality of network elements 110 which are connected via the various equipment in infrastructure 102, including the interconnection of a plurality of terminal blocks such as terminal blocks 108(1)-108(p). For example, a telephone call made between end user 112(1) and end user 112(2) may be routed using one or more terminal blocks 108(1)-108(p) and/or a various network elements 110 within infrastructure 102.

Figure 2:
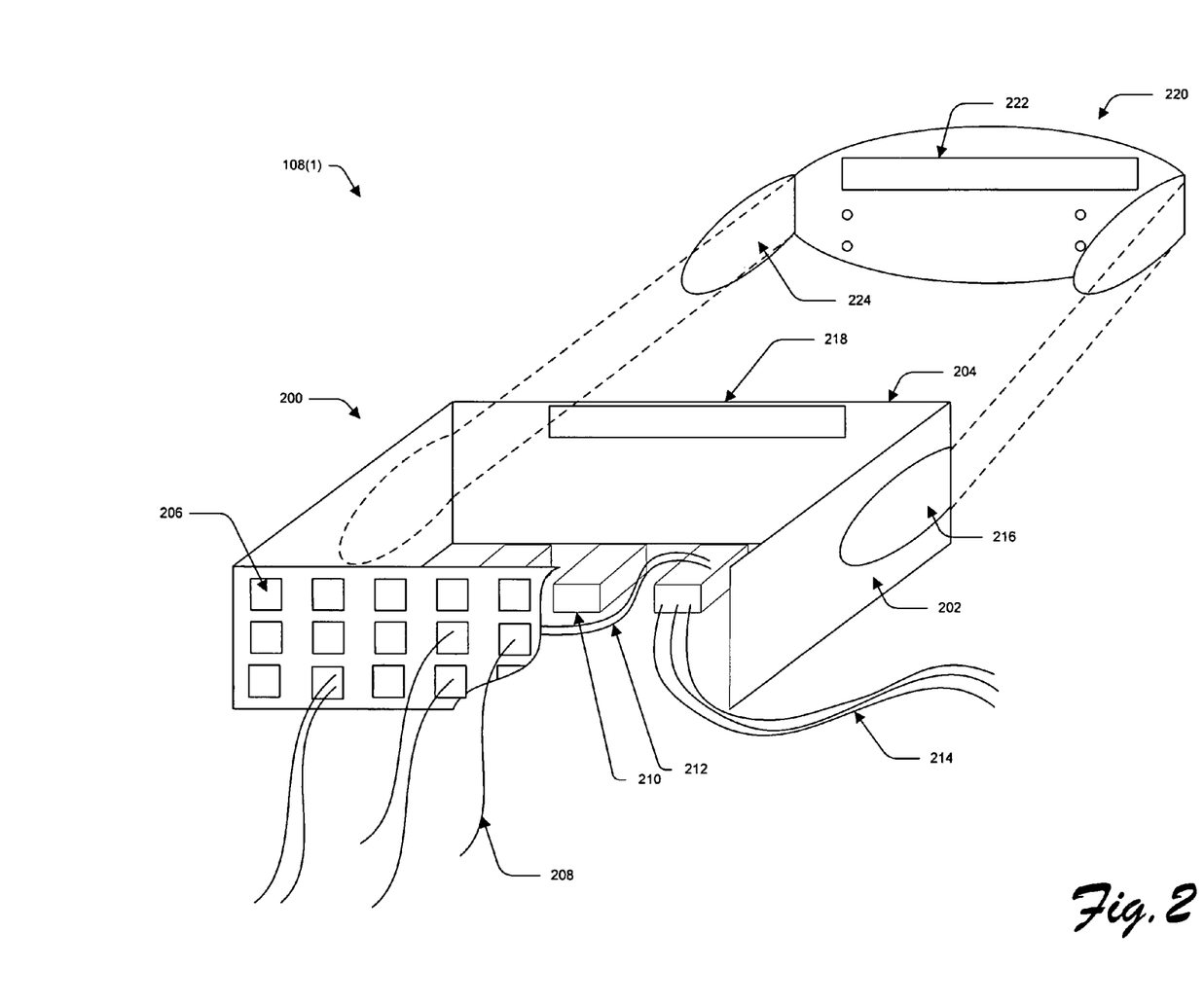
FIG. 2 illustrates an exemplary implementation of a terminal block of FIG. 1 with a corresponding mounting bracket.

FIG. 2 depicts an exemplary implementation of a terminal block 108(1) depicted in FIG. 1 in greater detail along with a corresponding mounting bracket. Terminal block 108(1) has a chassis 200 that 200 may be configured in a variety of ways. For example, chassis 200 may be formed from a variety of materials such as plastic, metal and so forth. As depicted in FIG. 1 chassis 200 may have a generally rectangular cross section. Other shapes of chassis 200 are also contemplated, such as square, triangular, oval and so forth. The interior of chassis 200 may be open, such as a box with an open end. The open interior of chassis 200 permits cabling, such as twisted pair cabling, to be run within the terminal block 108(1) to make connections to parts within the terminal block 108(1).

Chassis 200 includes a pair of sidewalls 202 adjoining a mounting surface 204. Chassis 200 further includes a portion having an array of terminations 206, for interconnecting equipment within infrastructure 102. Terminations 206 may be arranged across a surface of chassis 200. In FIG. 2 the surface having terminations 206 is depicted partially cut away to expose the interior of chassis 200.

Terminations 206 provide cabling connection points in a terminal block for signals into and out from the terminal block (e.g. transmit and receive). Typically, an array of terminations 206 is disposed upon at least one surface of chassis 200 such that the terminations 206 extend through chassis 200 and are supported by the chassis. Terminations may be configured in a variety of ways, such as pin terminations, insulation displacement connectors, screw terminals and so forth.

Terminations may interconnect to various equipment in infrastructure 102. For example, one terminal block may be connected to another terminal block via cabling 208. Further cabling 208 may connect to other types of equipment and devices in infrastructure, or to end user devices. Cabling 208 and terminations 206 may be connected using a removable connection (e.g., a male and female plug) such that cabling 208 may be easily and quickly connected, disconnected and reconnected to different terminations 206 of the same terminal block 108(1) or another terminal block.

Terminal block 108(1) may include a plurality of connectors 210. In this case, the terminal block is a "connectorized" terminal block, i.e., the terminal block includes connectors. Connectors 210 may be configured in a variety of ways. For instance, connectors 210 may be of a different length, width, depth, height and so forth and/or configured as different "types". For example, the connectors 210 may be 50 pin or 64 pin type connectors commonly used in terminal blocks within a main distribution frame in the telecommunications industry. Connectors 210 may also be configured as various other types and sizes suitable for making interconnections of equipment (e.g. cabinets 106, components 108 and network elements 110) in a telecommunication infrastructure 102. Connectors 210, for instance, may be used to connect incoming signals lines from end-users 112 and/or network elements 110. Further, connectors 210 may be used to connect outgoing signal lines running to end-users 112 and/or network equipment 110. Typically, twisted pair cabling is used within a terminal block and main distribution frame (e.g., cabinet 106) to make such connections. Other types of cabling may also be used, for instance fiber.

Terminations 206 are connected via cabling 212, such as twisted pair cabling, in the interior of chassis 200 to connectors 210. Connectors 210 are connected further to cabling 214. Cabling 214, similar to cabling 208 previously described, may connect to various equipment (e.g. cabinets 106, components 108, and network elements 110) or to end user devices. A connector 210 may also include male and female connector portions. Cabling 212 may be wired to one portion and cabling 214 to a corresponding portion of a connector 210. The portions of a connector 210 may be joined, separated and connected to other corresponding portions (e.g., male connected to female) in the same or a different terminal block, to provide a variety of signal pathways in infrastructure 102.

Network elements 110 or end-users 112 connected at each terminal block may be interconnected using cabling 208, 214 to create a variety of signal pathways suitable to transmit and receive signals from end-users 112 and network elements 110 in infrastructure 102. Thus, a terminal block (e.g., terminal block 200) may allow for numerous signal pathways to be created, maintained and changed, quickly and easily at a central location.

It is noted that a terminal block may also be a "non-connectorized" terminal block. Interconnections in a non-connectorized terminal block are made within the terminal without using connectors 210 and/or cabling 212. For instance, terminations 206 may connect cabling 208 through the terminal block directly to cabling 214.

Each sidewall 202 of chassis 200 may include a contact area 216. Additionally, the mounting surface 204 may include an attachment portion 218. Together, the contact areas 216 and attachment portion 218 may be used to secure the terminal block 108(1) in a telecommunications equipment housing 106 (for example, a distribution frame). In particular, terminal block 108(1) may be attached to a mounting bracket 220 configured to receive the terminal block 108(1).

FIG. 2 depicts an exemplary mounting bracket 220 having an attachment portion 222 and a pair of side arms 224 extending outward. Mounting bracket 220 may be secured to a housing 106 in a variety of ways. Further discussion of securing a mounting bracket, such as mounting bracket 220, to a housing may be found in relation to FIG. 3A. A corresponding terminal block 108(1) may be connected to the mounting bracket 220 which is secured to a housing 106, thereby securing the terminal block 108(1) within the housing 106. In particular, chassis 200 of terminal block 108(1) is configured to engage a corresponding mounting bracket 220.

A mounting bracket 220 includes one or more side arms 224. Each side arm 224 is configured to provide an attachment to a terminal block 108 along a corresponding sidewall 202. Thus, a mounting bracket, such as mounting bracket 220 is configured to connect to a corresponding terminal block 108(1) along at least one sidewall 202. In addition, a mounting bracket may be configured to connect to a terminal block via an attachment portion 222 of the terminal block 108(1). Thus, side arms 224 may be used alone, or in combination with an attachment portion 222 to connect to a terminal block 108(1) and thereby secure the terminal block to an equipment housing 106. For example, a mounting bracket 220 may connect to a terminal block 108(1) via one side arm 224 in combination with an attachment portion 222. Alternatively, a connection may be via a plurality of side arms 224 without using an attachment portion 222. Various other combinations of side arms 224 and attachment portion 222 are also contemplated.

In the implementation depicted in FIG. 2 for example, contacting areas 216 of chassis 200 are configured to engage a plurality of side arms 224 of mounting bracket 220 thereby securing the chassis 200 to mounting bracket 220 along sidewalls 202. Further, attachment portion 218 of mounting surface 204 may engage with the attachment portion 222 of mounting bracket 220. Thus, in FIG. 2 connection to terminal block 108(1) is provided by a plurality of side arms 224 and an attachment portion 222 in combination.

The contacting areas 216 and side arms 224 may engage to create an attachment in a variety of ways, such as through the use of various fasteners or interlocking designs. For instance, contact area 216 may include a groove, slot, pocket, bar, strip, recess and so forth into which a side arm 224 of the mounting bracket fits. The side arm 224 may slide, rest, or snap into to a corresponding contact area 216, and so forth to provide support to terminal block 108(1).

Generally any removable fastening techniques may be employed in the previously described techniques. Fastening may be accomplished by providing corresponding protrusions and indentations which mate to from an attachment. For instance, a ridge, pin, knob, tab, clip, hook, barb, bar or other protrusion included within the contact area 216 or side arm 224 may engage a corresponding notch, hole, slot, groove or other indentation on respectively a side arm 224 or contact area 216. Naturally, protrusions may be on the side arms 224 and indentations on the contact area 216 or vice versa. In addition, protrusions and indentations may be combined such that both protrusions and indentations are found on each side of the attachment (e.g., protrusions and indentations included in a contact area 216, that correspond to indentions and protrusions included on a side arm 224). Other fastening mechanisms are also contemplated, such as hook and loop, clasps, interlocking shapes, snaps, clips and so forth.

Similarly, the attachment portions 218 and 222 of the mounting surface 204 and mounting bracket 220 respectively may engage to create an attachment in a variety of ways. In general, attachment portion 218 and 222 may be configured to interlock, join, mate and so forth. For instance, one attachment portion (e.g., either of attachment portions 218 and 222) may include one or more notch, hole, clip, barb, slot, groove or other indentation. A corresponding attachment portion (the other of attachment portions 222 and 218) may include a ridge, pin, knob, tab, clip, hook, barb, bar or other protrusion. The corresponding protrusions and indentions may mate to form an attachment of the chassis 200 to the mounting bracket 220. Naturally, various combinations of indentations and protrusions disposed upon attachment portions 218 and 222 may be used. For instance, attachment portions 218 and 222 may each include a plurality of indentations and a plurality of protrusions which mate, one to another, to form an attachment.

The terminal block 108(1) may be pivotably attachable to the mounting bracket. In an implementation, the attachment portions 222 and 224 are configured to provide a pivotable attachment. The attachment portion 218 of the mounting surface 204 partially engages the attachment portion 222 of the mounting bracket. For example, attachment portion 218 configured as a slot on mounting surface 204 may be positioned to contact attachment portion 222 configured as a ridge on mounting bracket 220. One or more pivot points are formed where the attachment portions contact. The terminal block 108(1) then may be pivoted upon the attachment portion 222, such that the attachment portions 218 and 222 fully engage to form an attachment. Also, the corresponding side arms 224 and contact areas 216 engage to form an attachment on each sidewall 202 of the terminal block 108(1). In this manner, the terminal block 108(1) may be pivotably attached to the mounting bracket 220.

Terminal block 108(1) may be configured to be attached to a mounting bracket 220 in a variety of other ways, such as "snap-in", interlocking, slideably attachable, and so forth. For instance, the terminal block 108(1) may slide into the mounting bracket 220 along the side arms 224. In this instance, contact areas 216 may be configured with grooves to engage with corresponding ridges on the side arms 224. The terminal block 108(1) then slides along the ridges of side arms 224, and attachment portion 218 of the mounting surface 204 engages the attachment portion 222 of the mounting bracket 220.

Figure 3A:
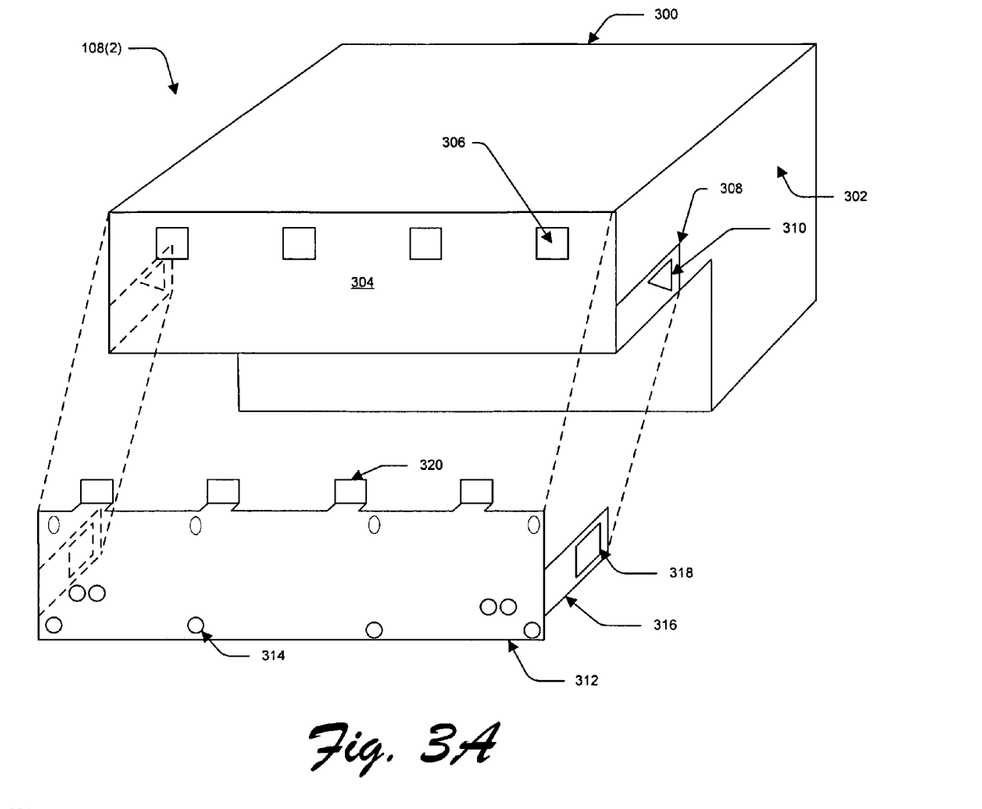
FIGS. 3A and 3B illustrate another exemplary implementation of a terminal block and a corresponding mounting bracket.

FIG. 3A depicts another exemplary terminal block 108(2) along with another exemplary mounting bracket corresponding to terminal block 108(2). Terminal block 108(2) includes a chassis 300 and a pair of sidewalls 302. Sidewalls 302 are adjacent to a mounting surface 304.

Mounting surface 304 includes an attachment portion. The attachment portion is configured as plurality of apertures 306. Further, each sidewall 302 includes a contact area. Each contact area includes a recessed region 308 and a protrusion 310. The protrusions 310 in FIG. 3A are depicted as substantially triangular. Naturally, the protrusions may be configured in a variety of ways, such as square, circular, hexagonal and so forth. Generally, the protrusions 310 are selected to match a corresponding indentation of a mounting bracket to which the terminal block may be secured as the following discussion will further describe.

A mounting bracket 312 is shown having a plurality of mounting mechanisms 314. Mounting mechanisms 314 may be configured in a variety of ways to secure the mounting bracket to a housing 106. For example, mounting mechanisms 314 may be configured to use a variety of fasteners such as screws, pins, clips, rivets, snaps, bolts and so forth. Mounting mechanisms 314, for instance, may be a pattern of holes to receive a plurality of screws to secure mounting bracket 312 to a housing 106. Mounting mechanisms 314 may be provided in various patterns which permit mounting the mounting bracket 312 in various differently configured housings 106.

In other implementations, the mounting bracket 312 may be secured to a housing 106 without fasteners, such as by "snapping in", interlocking, tabs and so forth. Further, while the mounting bracket 312 depicted in FIG. 3A may be separate from housing 106, it is contemplated that a plurality of mounting brackets 312 may be integrated into a cabinet 106, to secure a plurality of components 108, such as terminal blocks 108(1)-108(p) depicted in FIG. 1. Thus, rather than using mounting mechanisms 314 to secure the mounting bracket 312 to a housing 106, mounting bracket may be integrally formed to the housing 106 or fixedly fastened using welds, glue, and so forth.

Mounting bracket 312 has a pair of side arms 316 extending outward (into the plane of the drawing). The side arms 316 are depicted as each including an indentation 318. In particular, rectangular shaped indentations 318 are illustrated. Indentations 318 depicted in FIG. 3 pass entirely through the side arms 316 forming a rectangular hole. It is noted that the indentations 318 may alternatively extend only partially into the side arm to form a notched region.

Naturally, a variety of other shapes for indentations 318 may be used. For instance, square, triangular, polygonal, and so forth. The indentations 318 are configured to match and/or mate with corresponding protrusions 310 on the sidewalls 302 of a terminal block. Thus, in the implementation of FIG. 3A the indentation 318 is a rectangular hole which fits over the triangular protrusion 310 previously described, along the sidewall 302 of terminal block 108(2). The side arms 316 "snap-in" along the sidewalls such that the protrusion 310 engages the indentation 218 to removably hold the side arm 316 in place.

Mounting bracket 312 also has an attachment portion. The attachment portion is depicted having a plurality of substantially right-angled tabs 320 extending from an edge of the mounting bracket 312. Tabs 320 are configured to mate with a corresponding attachment portion of a terminal block, e.g., apertures 306.

Terminal block 108(2) depicted in FIG. 3A may be removably attached to a housing 106, using mounting bracket 312. For instance, the terminal block 108(2) may be positioned such that the plurality of apertures 306 partially engages the plurality of right-angled tabs 320 of mounting bracket 312. The terminal block may then be pivoted upon the tabs 320 such that side arms 316 of the mounting bracket 312 engage the contact areas of the sidewalls 302. In particular, the side arms 316 fit into the recessed areas 308 of sidewalls 302 such that the indentations 318 of the side arm fit over the corresponding protrusions 310 of the sidewall. The side arm 316 then provides support to the terminal block 108(2).

As the terminal block is pivoted, the plurality of right angled tabs 320 pass into the plurality of apertures 306. The plurality of tabs 320 provide support to the terminal block 108(2) and retain the terminal block 108(2) in a housing 106 in which the mounting bracket 312 has been secured. For instance, a portion of each tab 320 parallel to the mounting surface 304 retains the terminal block 108(2). A portion of each tab 320 perpendicular to the mounting surface 304 supports the terminal block on an edge of an aperture 306.

Figure 3B:
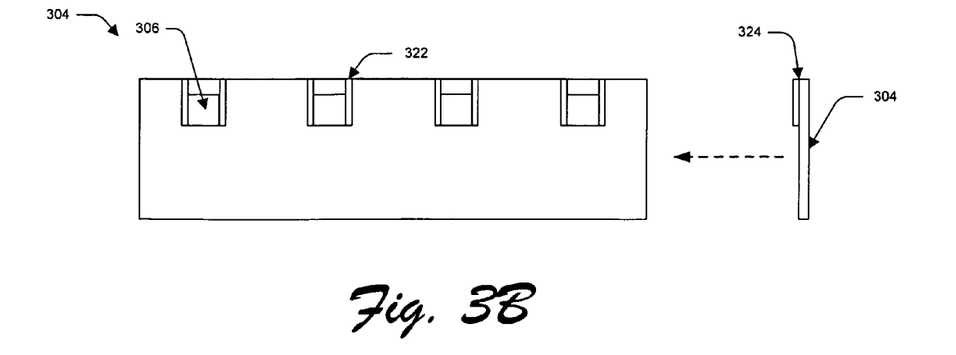
Figure 4A:
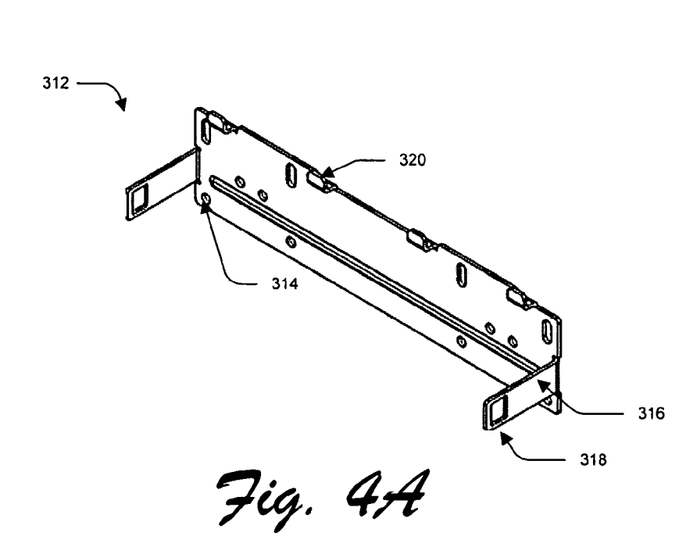
FIGS. 4A to 4D illustrate the exemplary mounting bracket of FIG. 3A in greater detail.
Figure 4B:
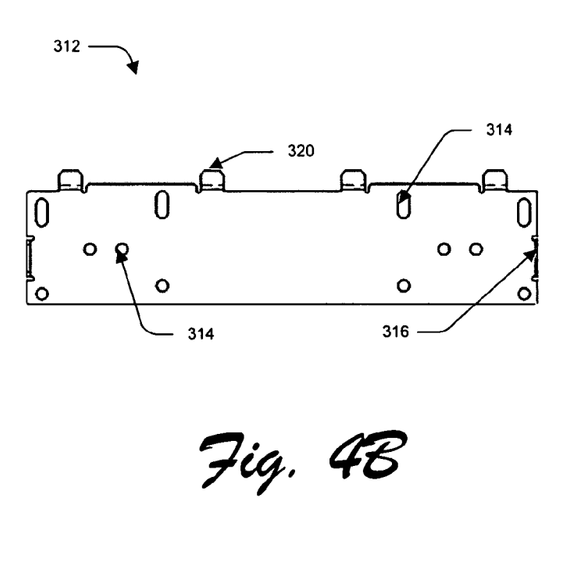
Figure 4C:
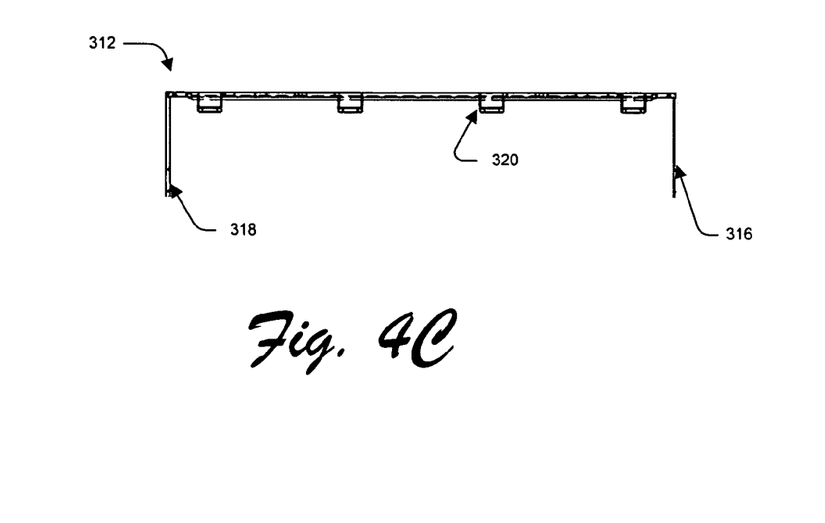
Figure 4D:
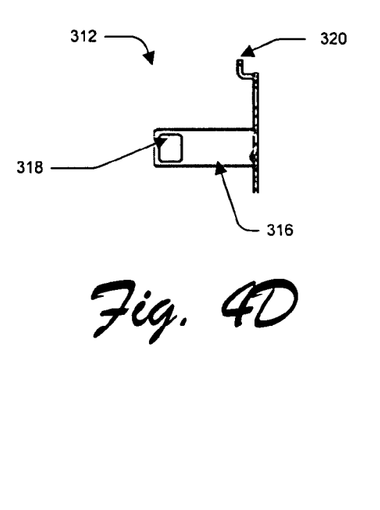

The plurality of tabs 320 may also be configured to "snap-in" to the terminal block 108(2). FIG. 3B depicts the interior of mounting surface 304 of FIG. 3A. In an implementation, mounting surface 304 includes a plurality of ridges 322 adjacent to the apertures 306. A tab 320, when inserted in an aperture 306 fits securely between the ridges 322 adjacent to the aperture 306. In other words, the tabs 320 "snap-in" between the ridges 322 as the terminal block 108(2) is pivoted into the mounting bracket 312.

FIGS. 4A to 4D depict mounting bracket 312 of FIG. 3A in greater detail. The various views illustrate mounting bracket 312 as having a plurality of mounting mechanisms 314, side arms 316 with indentations 318 and an attachment portion configured as a plurality of right-angled tabs 320. It is noted that the mounting bracket 312 may be integrally formed from a single piece. In an implementation, the body of mounting bracket 312 may be stamped out of metal, initially forming a substantially planar piece. The side arms 316 and the plurality of right-angled tabs 320 may then be bent into positions as depicted in FIGS. 4A-4D to form the mounting bracket 312. In different implementations, the mounting bracket may be formed in a variety of other ways such as from plastic, molded, by combining a number of parts and so forth.

Figure 5A:
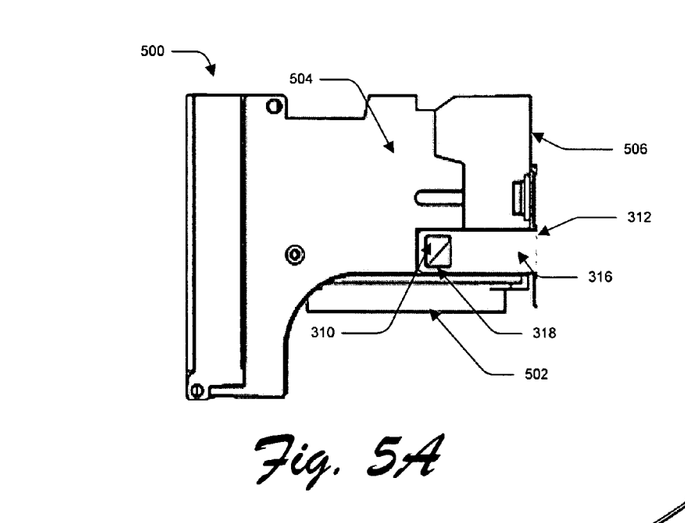
FIGS. 5A to 5C illustrate the exemplary mounting bracket of FIG. 3A and another implementation of a terminal block corresponding to the mounting bracket.
Figure 5B:
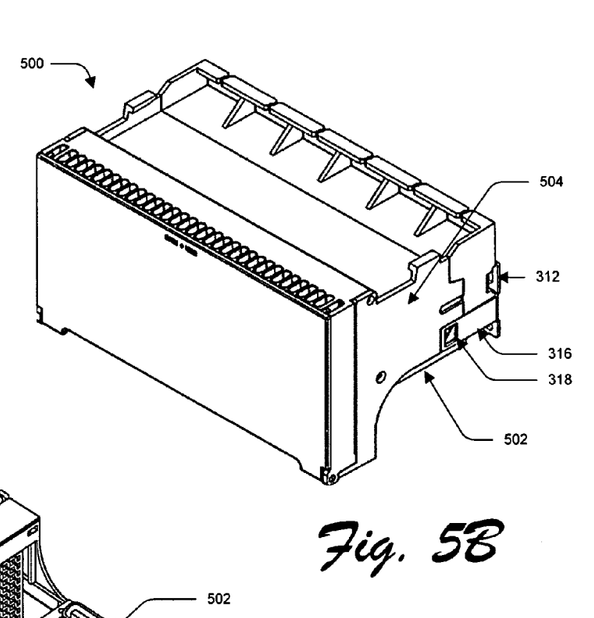
Figure 5C:
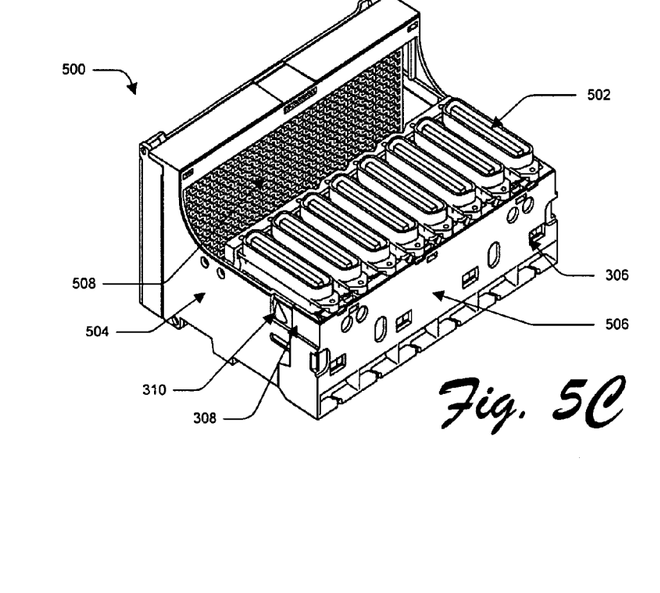

FIGS. 5A-5C depicts an exemplary connectorized terminal block 500 which may be mounted to a housing 106 using mounting bracket 312 of FIG. 3. FIGS. 5A and 5B depict terminal block 500 attached to mounting bracket 312. FIG. 5C illustrates features of terminal block 500 without an attached mounting bracket 312.

Terminal block 500 is illustrated with a plurality of connectors 502. Connectors 502 as illustrated are 50 pin connectors. Naturally, connectors 502 may be configured in a variety of ways previously described in relation to connectors 210 of FIG. 2. Terminal block 500 further includes a pair of sidewalls 504 adjoining a mounting surface 506. Each sidewall 504 has the contact area with a recessed region 308 and protrusion 310 as described in relation to FIG. 3. Further, mounting surface 506 includes an attachment portion configured as a plurality of apertures 306. A portion of terminal block 500 includes an array of terminations 508 as depicted from the inside of terminal block 500 in FIG. 5C. Terminations 508 may be configured in a variety of ways such as terminations 206 previously described in relation to FIG. 2.

In FIGS. 5A-5B, a side arm 316 is depicted engaged or fit into the recessed region 308 of the contact area. Further, indentation 318 is depicted as fitted over protrusion 310 of terminal block 500. The attachment portion of mounting bracket has engaged the attachment portion of mounting surface 506. In particular, the plurality of right-angled tabs 320 of mounting bracket 312 has passed into the plurality of apertures 306 of mounting surface 304.

Figure 6A:
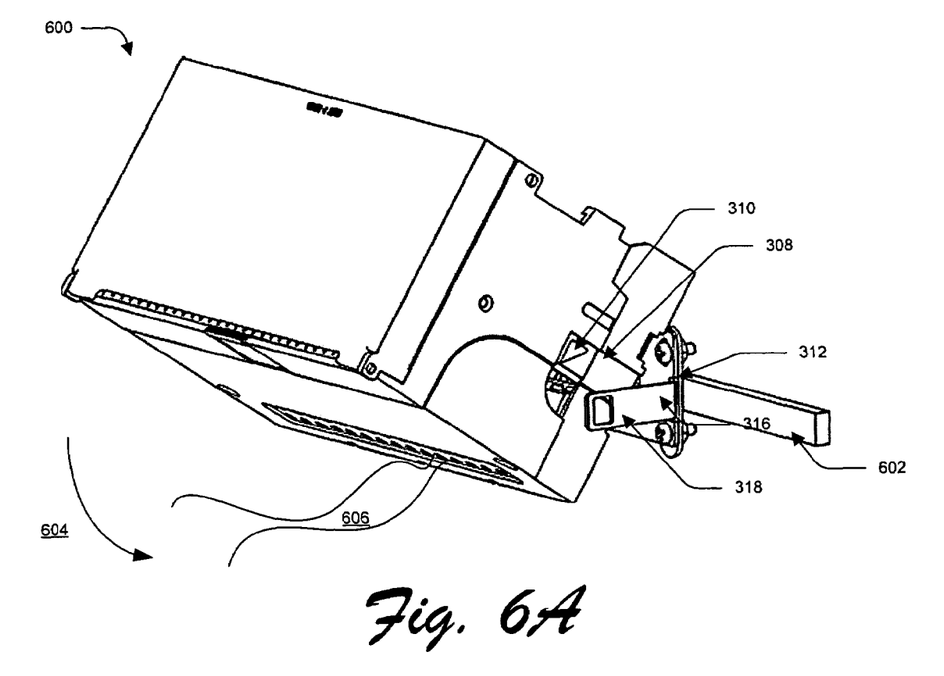
FIGS. 6A to 6B illustrate the exemplary mounting bracket of FIG. 3A fastened to a portion of an equipment housing and depicts the attachment of another exemplary terminal block to the mounting bracket.
Figure 6B:
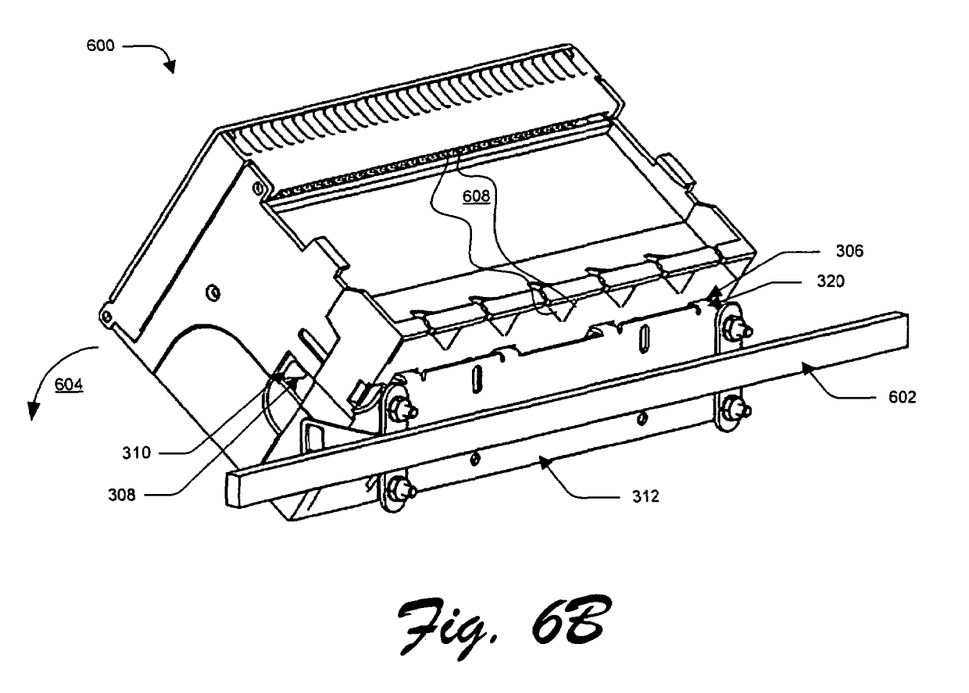

FIGS. 6A and 6B depict another exemplary terminal block 600 partially attached to a mounting bracket 312 of FIG. 4A-4D. Terminal block 600 is depicted as a non-connectorized terminal block. Terminal block 600 includes the contact area with a recessed region 308 and protrusion 310 corresponding to mounting bracket 312. Terminal block 600 further includes an attachment portion configured as a plurality of apertures 306. The mounting bracket 312 is depicted having been fastened to a portion 602 of a telecommunications equipment housing 106.

In FIG. 6A and 6B, the attachment portion of mounting bracket 312 has partially engaged the attachment portion of terminal block 600. In particular, the plurality of apertures 306 has partially received the right-angled tabs 320 of mounting bracket 312. One or more pivot points are created where the tabs 320 and apertures 306 contact. Thus, terminal block 600 may be pivoted upon the right-angled tabs 320, as illustrated by arrows 604. When the terminal block 600 is pivoted, the right-angled tabs 320 fully engage the apertures 306, and the side arms 316 attach to the terminal block 600 along sidewalls 302. In this manner, the terminal block may be a pivotably attached to mounting bracket 312 and mounted in a housing 106.

Exemplary cabling 606 and cabling 608 is depicted in FIGS. 6A and 6B respectively. Cabling 606 and 608 is representative of cabling and cable routing typically found in a terminal block 108 within a telecommunications infrastructure 102. It should be appreciated that the mounting techniques and mounting brackets described herein may allow for pre-wiring of a terminal block with cabling prior to mounting the terminal block into a housing 106. Connections of equipment (e.g., cabling, network elements and so forth) to a terminal block, such as terminal block 600, may be made before attachment of the terminal block to a mounting bracket. Further, a terminal block may easily be removed from a housing 106, to rewire, to perform maintenance, and so forth. This makes wiring a terminal block, managing cabling and maintaining telecommunication infrastructure, more efficient, convenient, and cost effective.

Also, attachment along the sidewalls and upon the mounting surface of a terminal block, rather than elsewhere on the terminal block chassis, permits mounting of the terminal block without interfering with the cabling connection points of the terminal block. Attachment features (which may include tabs 320, a recessed area 308 and/or protrusions 310) of a terminal block, such as terminal block 600, are positioned to avoid interferences with the portions and/or surfaces of the terminal block 600 which connect, route, and manage cabling. For instance in FIG. 6A, terminal block 600 may be pivotably attached to the mounting bracket 312 as described without impinging the cabling 606. Similarly in FIG. 6B, attachment of terminal block 600 does not interfere with cabling 608. The attachment features are maintained on portions and/or surfaces of terminal block 600 which are different than the portions and/or surfaces of terminal block 600 which expose terminations and connectors, and receive, manage and route cabling.

Further, having sidewall attachments allows for more efficient use of space compared to attachment on the portions and/or surfaces of a terminal block which do expose terminations and connectors, and receive, manage, and route cabling. For instance, space which would otherwise be needed for attachment features may be used to permit more connectors, terminations, cabling and so forth in the same sized terminal block. Thus, a terminal block using techniques described herein may have a relatively higher number of connections or terminations in the same area or volume of space within a housing 106 (e.g., a higher circuit density).

Figure 7:
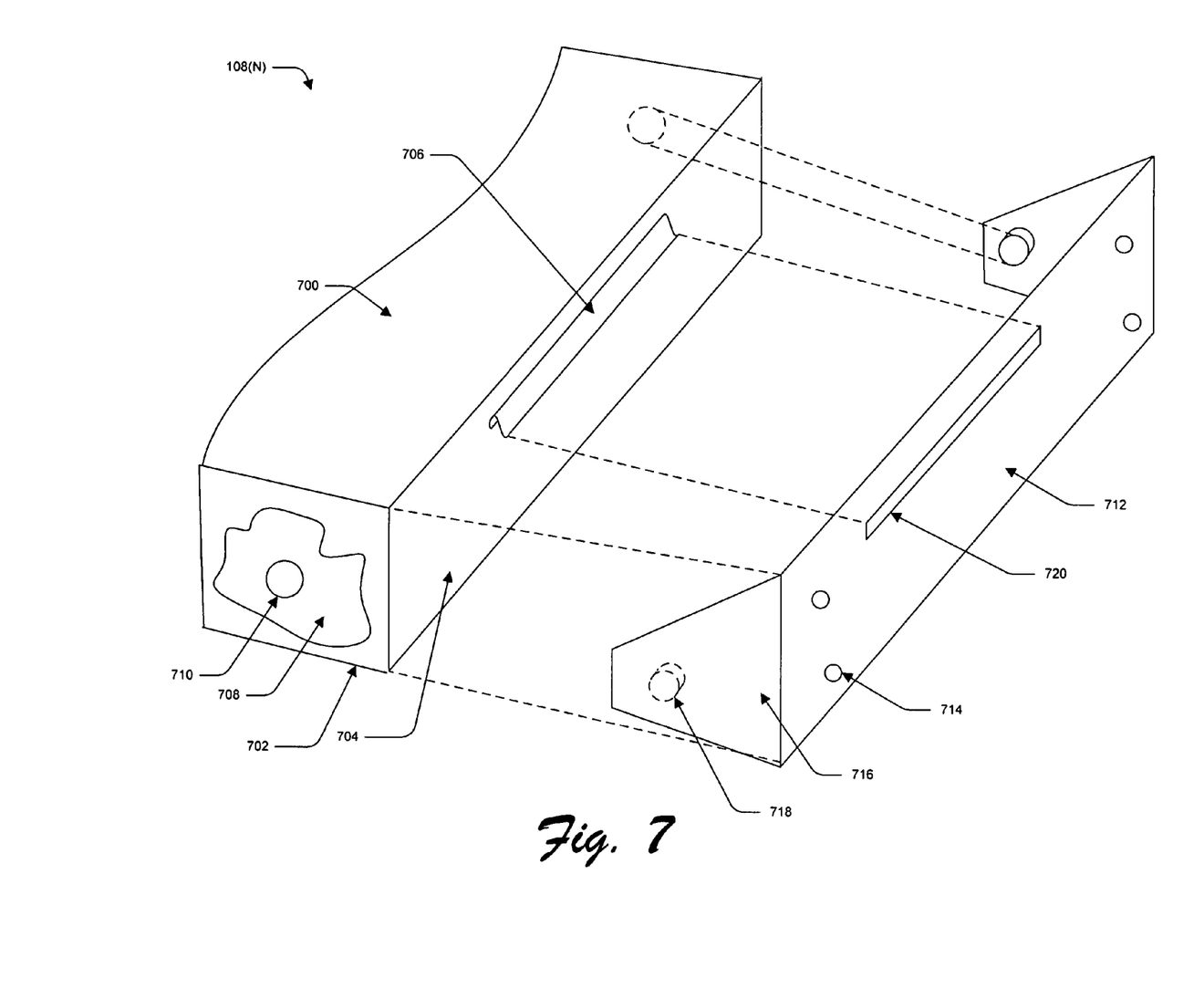
FIG. 7 illustrates another implementation of an exemplary mounting bracket and corresponding terminal block.

FIG. 7A depicts another exemplary implementation showing a portion of another terminal block 108(p) and a corresponding mounting bracket. The terminal block 108(p) has a chassis 700 with a pair of side walls 702 adjacent to a mounting surface 704. The mounting surface 704 has an attachment portion 706. The attachment portion 706 is configured as a clip extending out from the mounting surface 704. The clip maybe configured in a variety of ways, such as s-shaped, l-shaped, u-shaped, curved and so on. Although only one clip is depicted, a plurality of clips may also be used. The clip may be used to attach the chassis 700 (e.g., terminal block 108(p)) to a housing 106, such that the clip provides support to the chassis 700. The sidewalls 702 each include a contact area 708. Within contact areas 708, the sidewalls 702 each have an indention 710 configured as circular hole in the sidewall 702.

A mounting bracket 712 includes mounting mechanisms 714 and a pair of side arms 716. The side arms 716 each include a protrusion 718 configured as a cylindrical knob. An attachment portion 720 of the mounting bracket 712 is also illustrated. The attachment portion 720 is a slot cut though the mounting bracket 712. Although only one slot is depicted, it is contemplated that a plurality of slots corresponding to a plurality of clips on the mounting surface 704 may be used in other implementations.

Mounting bracket 712 may be used to secure terminal block 108(p) to a housing 106. For instance, mounting bracket 712 may be secured to a housing 106 using mounting mechanisms 714. The terminal block 108(p) may be attached to the bracket 712, such that the attachment portion 706 of mounting surface 704 engages attachment portion 720 of the mounting bracket 712. In other words, the clip may pass through the slot. Additionally, the indentations 710 (e.g. circular holes) on the chassis 700, and in particular within the contact area 708 of sidewalls 702, may receive the protrusions 718 (e.g., cylindrical knobs) on the side arms 716 of the mounting bracket 712. In this manner, the terminal block 108(p) may be secured to the mounting bracket 712 and accordingly mounted in housing 106.

Exemplary Procedures

The following discussion describes techniques that may be implemented utilizing the previously described systems and devices. The procedures are shown as a set of blocks that specify operations performed and are not necessarily limited to the orders shown for performing the operations by the respective blocks.

Figure 8:
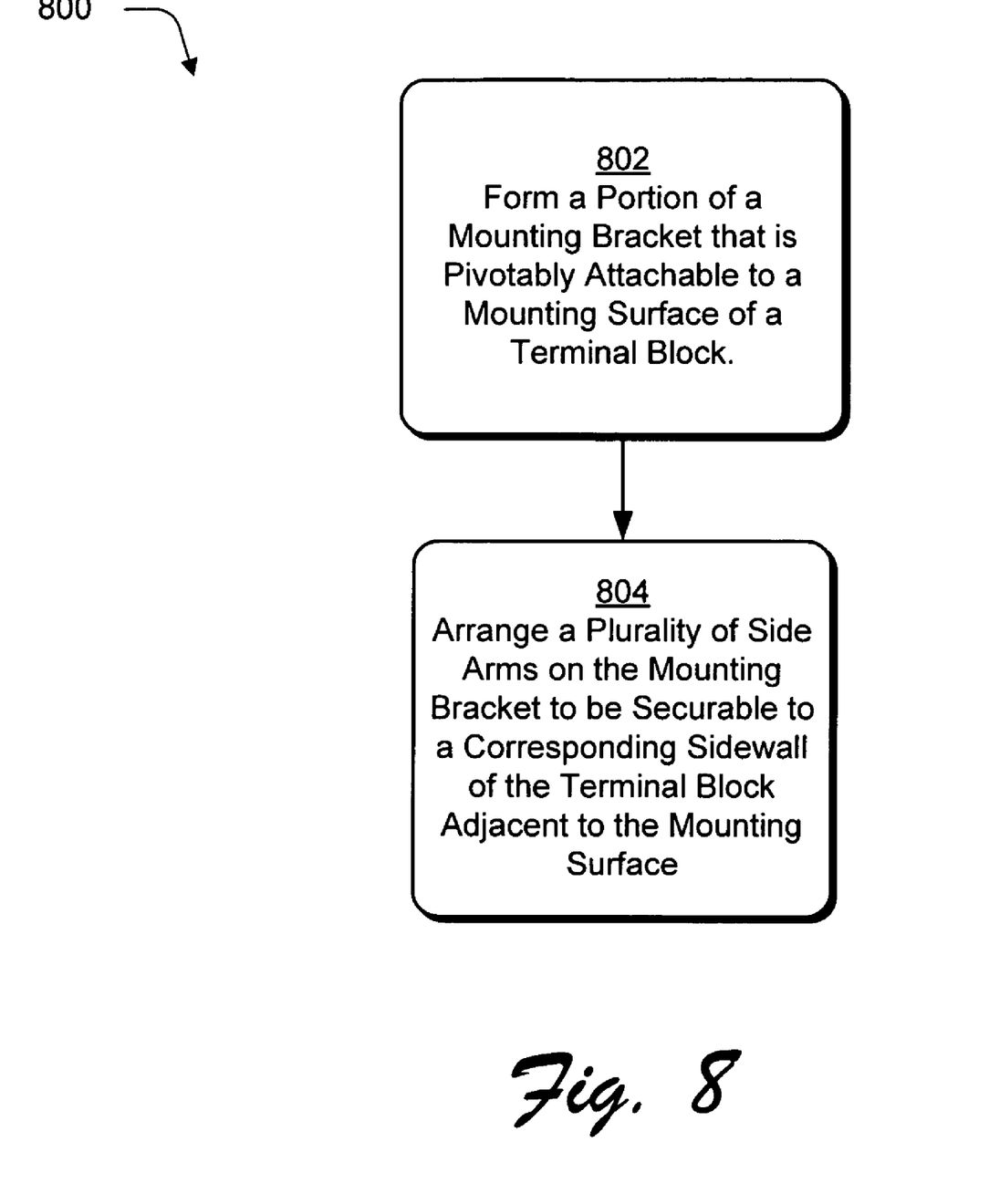
FIG. 8 is a flow diagram that depicts forming a mounting bracket to secure a terminal block in a telecommunications housing.

FIG. 8 is a flow diagram depicting a procedure 800 in an exemplary implementation in which a mounting bracket to secure a telecommunications terminal block is formed. A portion of a mounting bracket is formed which pivotably attaches to a mounting surface of a terminal block (block 802). For example, the attachment portion depicted in FIG. 3A may be formed on a mounting bracket 312. Attachment portion is configured as plurality of right-angled tabs 320. The attachment portion with a plurality of right-angled tabs 320 may engage a mounting surface 304 of a terminal block 108(2). Mounting surface 304 has an attachment portion configured as a plurality of apertures 306. Thus, the tabs 320 and apertures 306 may engage thereby permitting a pivotable attachment of the attachment portion (e.g., the plurality of right-angled tabs 320) to the mounting surface 304

A plurality of side arms is arranged on the mounting bracket, each of which is securable to a corresponding sidewall of a terminal block adjacent to the mounting surface (block 804). For instance, FIG. 3A depicts a pair of side arms 316 arranged on mounting bracket 312. The side arms 316 depicted in FIG. 3A extend out generally perpendicularly from the body of mounting bracket 312. The side arms 316 each may be secured to a sidewall 302 of terminal block 108(2). The sidewalls 316 depicted in FIG. 3A are adjacent to mounting surface 304. Further, the side arms are securable such that they are perpendicular to the mounting surface 304.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising:
   a terminal block to interconnect a plurality of network elements in a telecommunications infrastructure having a pair of sidewalls adjoining a terminal block mounting surface; and
   a mounting bracket having one or more side arms adjoining a mounting bracket mounting surface that is attachable to the terminal block mounting surface, wherein each said side arm is configured to engage a corresponding said sidewall thereby securing the terminal block to the mounting bracket, and wherein the mounting bracket mounting surface includes a plurality of right-angled tabs extending from an edge of the mounting bracket, wherein a first portion of each right angled tab is perpendicular to the mounting bracket and second portion of each right angled tab is parallel to the mounting bracket.

2. An apparatus as described in claim 1 further comprising at least one contacting area on each sidewall wherein at least one side arm interlocks with a corresponding said contacting area when the mounting surface is attached to the mounting bracket.

3. An apparatus as described in claim 1 wherein the terminal block mounting surface includes an attachment portion configured to join with a corresponding said portion of the mounting bracket to removably attach the terminal block to the mounting bracket.

4. An apparatus as described in claim 3 wherein the attachment portion of the mounting surface includes a plurality of apertures, each of which is configured to mate with a corresponding one of the plurality of right-angled tabs.

5. An apparatus as described in claim 1 wherein each said sidewall includes a recessed region and a protrusion configured to receive a corresponding said side arm of the mounting bracket.

6. An apparatus as described in claim 1 wherein the mounting bracket includes a plurality of mounting mechanisms to secure the mounting bracket to at least one telecommunications housing.

7. An apparatus as described in claim 1 wherein:
   each of the plurality of right-angled tabs is configured to partially engage one of a plurality of apertures disposed upon the mounting surface such that the terminal block may be pivoted upon the plurality of right-angled tabs;
   each said sidewall includes a recessed region and a protrusion;
   each said side arm of the mounting bracket includes at least one indentation; and
   the terminal block is removably attachable to the mounting bracket by pivoting the terminal block upon the plurality of right-angled tabs such that:
      the plurality of right-angled tabs engage the corresponding apertures;

each side arm fits into a respective recessed region of a corresponding sidewall; and the at least one indentation of each side arm mates with a respective protrusion of a corresponding sidewall.

8. A terminal block comprising:

a chassis having at least one sidewall adjoining a mounting surface, the sidewall being substantially perpendicular to the mounting surface;

a plurality of connectors disposed within the chassis; and an array of terminations disposed upon at least one surface of the chassis and wired to the plurality of connectors, wherein:

the plurality of connectors and array of terminations are configured to form a plurality of signal pathways between a plurality of network elements in a telecommunications infrastructure;

the mounting surface is pivotably attachable to a bracket wherein the mounting surface includes an attachment portion which mates with a corresponding attachment portion of the bracket to pivotably attach the mounting surface to the bracket; and each said sidewall is configured to secure the chassis to the bracket.

9. A terminal block as described in claim 8, wherein each said sidewall includes at least one indentation which mates with a corresponding protrusion on the bracket to removably attach the terminal block to the bracket along the sidewall.

10. A terminal block as described in claim 8, wherein each sidewall includes at least one protrusion which mates with a corresponding indentation on one of a plurality of side arms arranged on the bracket to secure the sidewall to the bracket.

11. A terminal block as described in claim 8, wherein the attachment portion of the mounting surface includes at least one aperture which mates with a corresponding tab on the attachment portion of the bracket.

* * * * *